March 21, 1961  J. P. PROPST III  2,975,978
MANURE HANDLING DEVICES
Filed June 29, 1959  3 Sheets-Sheet 1

INVENTOR.
JAMES P. PROPST, III
BY
ATTORNEY

March 21, 1961  J. P. PROPST III  2,975,978
MANURE HANDLING DEVICES
Filed June 29, 1959  3 Sheets-Sheet 2

INVENTOR.
JAMES P. PROPST, III
BY
ATTORNEY

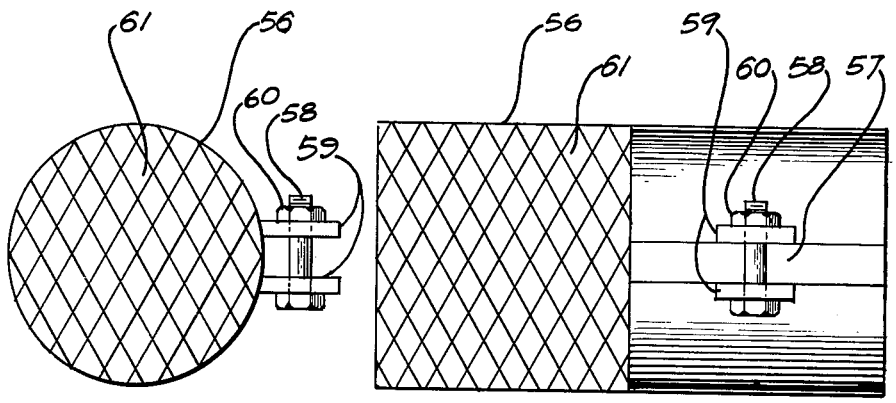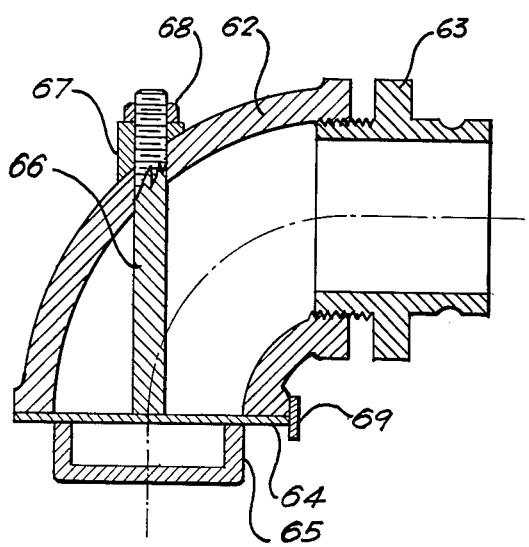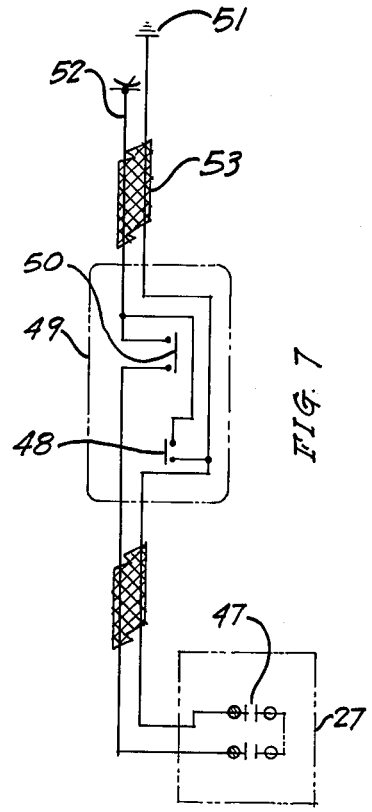

United States Patent Office 2,975,978
Patented Mar. 21, 1961

2,975,978
MANURE HANDLING DEVICES

James P. Propst III, Tucker, Ga., assignor to Superior Tank Corporation, Tucker, Ga., a corporation of Georgia Filed June 29, 1959, Ser. No. 823,504

6 Claims. (Cl. 239—148)

This invention relates to fertilizing, and more particularly to a new and improved device for collecting liquid manure, transporting such to desired locations, and there spraying it upon the ground in a suitable manner. As such it is commercially known as a liquid manure spreader.

The field of animal husbandry may also be embraced by the instant invention.

Heretofore ordinary manure has been spread in various manners, ranging from the pitchfork to more complicated mechanical devices handling the relatively dry material in a conventional distributing action. Other fertilizers such as ammonia and nitrogen for example have been sprayed over or drilled into the ground, but only recently has the demand arisen for the handling of liquid manure in this fashion.

This need has been largely brought about by improved methods of hog culture in which the animals are in effect raised on concrete in limited areas somewhat humorously called "pig's parlors" in which they are prevented from roaming and foraging, thereby taking off weight; are given the proper foods in the proper quantities, at regular intervals; and disassociated with the filth that usually characterizes the raising of hogs, the latter being accomplished in large part by the provision of pits in the "parlors" into which all refuse including droppings gravitates, and which serve as temporary reservoirs for the water generated by hosing the enclosures during periodic cleanings. Such pits in turn must be emptied of course, and it is with this operation, plus the reclaiming of the manure there present and spreading such, which is high in fertilizer content and value, that this invention is concerned.

An object of the invention is to provide a liquid manure collector and spreader that is simple and positive in operation.

Another object is to provide facile adjustability of distribution in such a device.

Another object is to provide an automatic cut-off for the tank of a liquid manure collecting instrumentality.

Another object is to provide a hose suction strainer for such a device.

A still further object is to provide rugged and positive flow control.

Another object is to provide ready access for cleaning a manure spreader.

Another object is to provide a relief valve in conjunction with a combined pressure and vacuum gauge in such a machine.

Another object is to provide convenient controls for the operation and manipulation of a liquid manure spreader.

Another object is to provide rugged construction thereof.

Another object is to provide economy of operation and maintenance.

Another object is to provide ready replacement of parts.

Another object is to provide initial economy in manufacture.

These and other objects made apparent during the further progress of this specification are accomplished by means of the instant invention, a full and complete understanding of which is facilitated by reference to the drawings herein, in which:

Fig. 4 is a top plan view of the strainer employed with the suction hose of the device;

Fig. 5 is a side view of the complete suction strainer;

Fig. 6 is a vertical sectional view of the spray elbow adjustable spray plate of the device; and Fig. 7 is a wiring diagram, with particular reference to the automatic cutoff feature of the machine as employed in the filling operation of the tank thereof.

Figure 1:
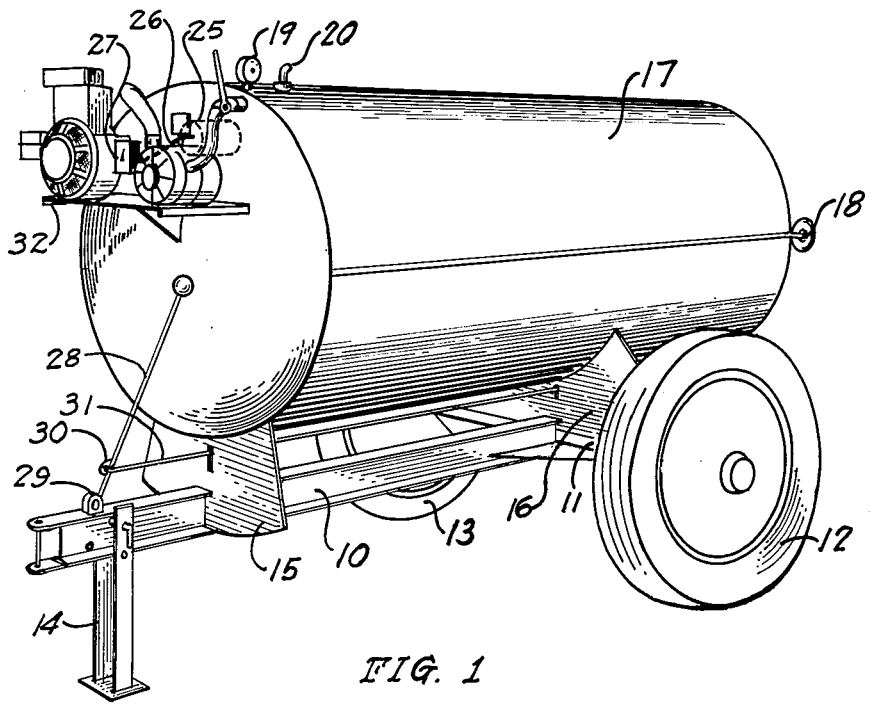
Fig. 1 is a view in perspective of the spreader.
Figure 2:
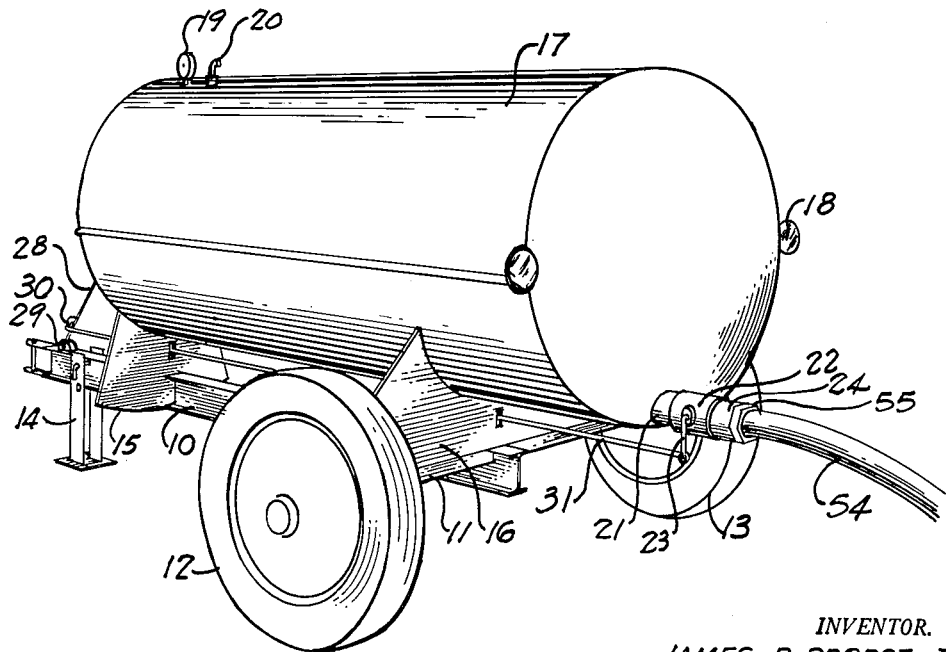
Fig. 2 is a view similar to that of Fig. 2, but taken from the rear and showing the machine in a collecting position.

Referring now to the drawings, in which like numerals designate corresponding parts throughout the various figures, 10 indicates the main frame of the chassis of the spreader, to the rear of which is mounted an axle 11 carrying wheels 12 and 13. A pivoted supporting jack 14 may be positioned at the front of 10, and a front main tank support 15 followed by a rear main support 16 adjacent the axle is likewise associated with this member.

Carried by 15 and 16, is a main tank 17, which may be of conventional construction, fabricated of suitable materials, preferably metal, and of a strength in keeping with good engineering practices. The size of the tank may vary, depending upon the exact use, and particularly field use, to which it is to be put, but it is contemplated that a considerable volume of liquid manure will be picked up and then dispersed upon each trip or operation. 18 represents circular reflector lights on the rear of the tank.

Mounted on or near the top of 17 is a combined pressure and vacuum guage 19, which cooperates with adjacent relief valve 20 to maintain an optimum maximum internal pressure within the device while operative of about 12 p.s.i.

Mounted in the lower rear end of the tank is a primary discharge pipe 21, connected to which is a conventional cock valve 22 which is actuated by a handle 23; a female coupler 24 being in turn securely connected to the valve.

A float 25 is mounted interiorly near the front of the tank in conjunction with rotatable elbow or arm 26 which protrudes through the front of 17 by way of a suitable seal, and into a float switch box 27, where it operates to cut off the engine during a filling phase of the machine in a manner described in detail hereafter.

Cock or spray valve 22 is operated by means of a spray lever 28 which is pivoted near the front of 10 as at 29, and in turn has pivoted to it as at 30, a shaft or rod 31 which is adjustable anchored to lever or handle 23; it being apparent that a rearward movement of 28 serves to drive 31 and hence 23 in that direction, and thereby open valve 22, while a forward movement of said lever closes the valve.

Figure 3:
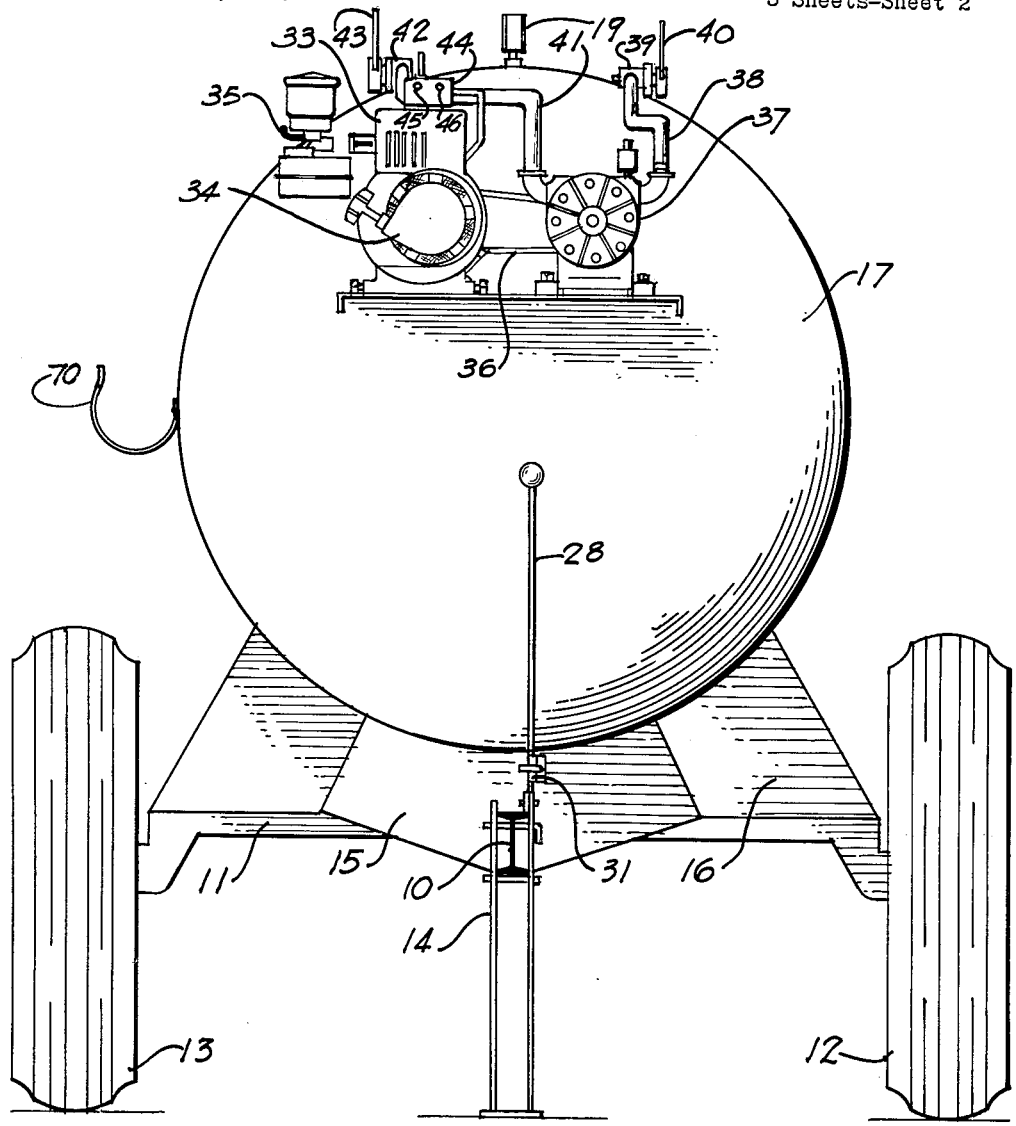
Fig. 3 is an enlarged front view of the structure of Fig. 1, showing the engine, pump, controls, and certain other details.

Rigidly mounted on the front of the tank is a supporting platform 32, which carries a conventional gasoline engine of appropriate horsepower and design, same being designated by the numeral 33 (Fig. 3), and having the usual engine recoil starter 34, choke 35, and a drive belt 36 which connects with a pump 37 mounted opposite on the platform, said pump serving either as a suction or a vacuum instrumentality, as will be described during the further progress of this specification.

A hose 38 connects the pump with a three-way cock valve 39, which is actuated by a handle 40, and tank 17 on one side; and a similar hose 41 and valve 42 with handle 43, connects on the other side. Switch box 44 houses switches 45 and 46 which control the engine and pump respectively.

Reference is now made to the wiring diagram of Fig. 7, in which 47 indicates a float switch which is normally open, 48 a supplementary engine switch, housed in a switch box 49 in conjunction with an automatic cutoff bypass switch 50; 51 an engine ground, and 52 a wire leading to the engine condenser; conventional wiring involved all being contained in two pole wire 53.

Attention is now directed to suction hose 54, which is attached to coupler 24 through hose shank adaptor 55, and on the opposite end of the hose is positioned a strainer member 56, held in position by clamp 57 in conjunction with bolt 58, spacer members 59, and nut 60. Member 56 consists essentially of a filter, formed of metal or other suitable material and having a series of openings 61 in both its side and end portions through which water, droppings, and small particles can freely pass, but which prevents the entrance of wood shavings or other undesirable material into the tank, thereby precluding clogging, and particularly during the subsequent spraying operation.

Special attention is now directed to the elbow spray of the instant device, which comprises an elbow element 62, which may be snugly secured to valve 22 at the appropriate time through a female adaptor 63. Adjustably positioned at the lower or discharge end of 62 is a spray plate 64 having a convenient handling surface 65 formed integral with the bottom thereof, and a bolt 66 extending upwardly through a threaded elbow bracket 67 formed in the upper portion of 62, which bolt in cooperation with a nut 68 permits the vertical adjustment and fixing in place of plate 64 at desired distances from the bottom or lower lip of 62, thereby regulating the amount and nature of the spray generated during the manure spreading operation. A semi-circular shield 69 is positioned to the rear of 62 and 64, thereby preventing spray from being directed in an undesirable manner against the tank and its chassis and wheels, yet permitting free discharge over a relatively wide area during fertilizing.

The operation of the device of the invention is as follows:

Hose 54 is attached to valve 22 and dropped into a "pig parlor" pit ready to be drained, spray lever 28 being pushed rearwardly so that valve 22 is open and ready ingress to the tank thereby made possible. Motor and pump switches 45 and 46 are then turned on and the engine started. Valve 39 is then set to suck air from the tank, and valve 42 set so that it is blowing out air. The tank is now filling, which operation normally consumes about five or ten minutes.

As the tank fills, float 25 rises during the latter part of this operation, and in so doing, turns elbow 26 in such a manner as to close float switch 47, thereby completing the circuit at this point and grounding out the engine condenser through wire 52, which terminates the operation at this point. Spray lever 28 is then pulled forwardly to actuate valve 22 and thereby retain the liquid in the tank. To resume engine operation, cutoff valve 50 (bypass switch), which is normally closed, may now be opened, thus breaking the ground circuit, and the engine cranked as usual. Engine switch 48 as an auxiliary item simply allows a cutoff of the engine at any desired time.

The hose is now disconnected from the tank and preferably mounted on the side thereof with the aid of clips 70, the tank attaching to a suitable towing vehicle such as a tractor for example, jack or kick-stand 14 elevated out of the way, and the machine moved to a field or other place where a fertilizing operation is to be accomplished.

To do this, spray nozzle 62 is secured in place adjacent valve 22, pump switch 46 is cut off, the engine started, valve 39 is set so that air is being sucked in, valve 42 is set so that air is being blown into the tank, and when guage 19 shows between 8 and 12 p.s.i., conditions are ripe for spraying. This commences with the actuation of lever 28 rearwardly and attendant opening of valve 22, spray plate 64 having been previously adjusted to a desired height or opening. The spraying action continues until tank 17 is empty, upon which the engine is cut off and the device returned to the pits for refilling, the cycle then being repeated as often as is necessary or desirable.

From the foregoing it is apparent that there has been shown and described herein a new and improved liquid manure collector and spraying device that is simple in operation, rugged in construction, and thoroughly adapted for its intended purposes. In this connection it may be mentioned that while fertilizing is the prime function intended for the device at this point, it is apparent that it may have other uses, such as a portable fire-fighting apparatus for example, in which case the tank would be filled with water, and towed to the scene of the fire, there to discharge water through a suitable nozzle arrangement provided at the rear for this purpose. Water could be replenished from streams, lakes, or other sources found in the open; such a fire-fighting instrumentality being particularly useful to the forestery service in dealing with fires in wooded areas.

It is further apparent that while one form of the device has been described in considerable detail, no limitation is implied or intended thereby, but on the contrary, certain modifications, additions, deletions, changes, reconstructions, rearrangements and the like may be resorted to without departing from the scope of the appended claims, which are to be accorded a construction and scope fairly in keeping with the contribution to the art.

I claim:

1. In a device of the character described, a vehicle chassis including a support frame, an enclosed tank positioned thereon, a pump mounted on the tank, an engine situated adjacent the pump, a drive belt connecting the engine and the pump, valve means for reversing the action of said pump so that it is either drawing air from or blowing air into the tank, a pressure guage mounted on the tank, a discharge outlet at the rear of the tank, a cock valve connected thereto, means for actuating said valve including a connecting rod and operating lever pivotally mounted near the front of the tank; an elbow spray connected to the valve, a spray plate at the discharge end of said elbow, and means for adjustably regulating the distance between said plate and said discharge end whereby the amount and nature of fluid material ejected at a given time is determined and governed.

2. In a device of the character described, a vehicle chassis, a tank mounted thereon, an engine mounted on the tank, a pump positioned adjacent the engine and driven thereby, means for regulating the action of the pump so that it is either drawing air from the tank or forcing air thereinto, a discharge outlet for the tank, a valve connected thereto, a handle for said valve, means for actuating said handle including a connecting member attached thereto and a pivoted lever adjacent the front of the tank; a spray element attached to the discharge end of the valve member, a spray plate disposed adjacent the discharge end of the spray element, and means for adjustably regulating the plate with reference to the spray whereby the amount of fluid material discharged therefrom is governed.

3. The device of claim 2, in which the regulating means for the spray plate consists of a bolt extending through an elbow bracket in the spray element and locked in position by a nut.

4. The device of claim 1, in which a shield is positioned to the rear of the spray element and plate for the purpose of preventing liquid manure from being directed against the tank and chassis.

5. The device of claim 1, in which the spray plate is provided with a handle member to facilitate in the adjustment thereof.

6. In a device of the character described, a vehicle chassis including a frame and wheels, an enclosed tank positioned thereon, a pump mounted on the tank, means for driving said pump, a pair of valves for reversing the action of said pump so that it is either drawing air from or blowing air into the tank, a float positioned within the tank and communicating with a switch on the outside thereof whereby to cut off the pump when the tank is full, a bypass switch in the cutoff circuit that may be opened after the engine has been grounded out by float action, thereby restoring a normal circuit and permitting the starting of the engine, a combined pressure and suction guage mounted on the tank, an automatic relief valve likewise so mounted, a suction hose removably attached to the rear of the tank, a removable strainer attached to the opposite end of said hose, and valve means positioned between the hose and the tank and governing the flow of material into and out of said tank.

References Cited in the file of this patent

UNITED STATES PATENTS

| 703,167 | Weiler | June 24, 1902 |
| 2,792,255 | Bellows | May 14, 1957 |

FOREIGN PATENTS

| 22,212 | Australia | Feb. 4, 1936 |